United States Patent
Baldwin et al.

(10) Patent No.: US 11,738,492 B2
(45) Date of Patent: Aug. 29, 2023

(54) METHODS OF PRODUCING POLYOLEFIN FOAM SHEETS AND ARTICLES MADE THEREOF

(71) Applicant: Toray Plastics (America), Inc., North Kingstown, RI (US)

(72) Inventors: Jesse J. Baldwin, Strasburg, VA (US); Gary H. Clark, Front Royal, VA (US); Donald A. Foltz, Fort Valley, VA (US); Paul F. Geibler, Lake Frederick, VA (US); Pawel Sieradzki, Cross Junction, VA (US)

(73) Assignee: Toray Plastics (America), Inc., North Kingston, RI (US)

( * ) Notice: Subject to any disclaimer, the term of this patent is extended or adjusted under 35 U.S.C. 154(b) by 1180 days.

(21) Appl. No.: 15/087,139

(22) Filed: Mar. 31, 2016

(65) Prior Publication Data
US 2017/0282430 A1   Oct. 5, 2017

(51) Int. Cl.
| | | |
|---|---|---|
| *B29C 35/08* | (2006.01) | |
| *B29C 44/34* | (2006.01) | |
| *C08J 9/10* | (2006.01) | |
| *B29C 48/00* | (2019.01) | |
| *B29C 44/56* | (2006.01) | |
| *B29C 71/04* | (2006.01) | |
| *B29C 44/50* | (2006.01) | |
| *B29K 23/00* | (2006.01) | |
| *B29K 105/04* | (2006.01) | |

(52) U.S. Cl.
CPC ...... *B29C 48/0012* (2019.02); *B29C 35/0805* (2013.01); *B29C 35/0866* (2013.01); *B29C 44/3415* (2013.01); *B29C 44/5627* (2013.01); *B29C 48/0022* (2019.02); *B29C 71/04* (2013.01); *C08J 9/103* (2013.01); *B29C 44/50* (2013.01); *B29C 2035/085* (2013.01); *B29C 2035/0872* (2013.01); *B29C 2035/0877* (2013.01); *B29K 2023/06* (2013.01); *B29K 2023/12* (2013.01); *B29K 2105/04* (2013.01); *B29K 2995/0072* (2013.01); *C08J 2201/026* (2013.01); *C08J 2201/03* (2013.01); *C08J 2203/04* (2013.01); *C08J 2323/14* (2013.01); *C08J 2423/20* (2013.01)

(58) Field of Classification Search
CPC ............ B29C 35/0866; B29C 44/3415; B29C 44/5627; B29C 47/0066; B29C 47/0042; B29C 71/04; B29C 48/0012; B29C 35/0805; B29C 44/50; B29C 2035/085; B29C 2035/0872; B29C 2035/0877; B29K 2023/06; B29K 2023/12; B29K 2105/04; B29K 2995/0072; C08J 9/103; C08J 2201/026; C08J 2201/03; C08J 2203/04; C08J 2323/14; C08J 2423/20
See application file for complete search history.

(56) References Cited

U.S. PATENT DOCUMENTS

| | | | |
|---|---|---|---|
| 2,821,254 A | | 1/1958 | Kernen |
| 3,230,803 A | | 1/1966 | Guilford |
| 3,476,845 A | | 11/1969 | Buff et al. |
| 3,630,114 A | | 12/1971 | Bunting, Jr. et al. |
| 3,747,448 A | | 7/1973 | Carbone |
| 3,874,988 A | | 4/1975 | Buff et al. |
| 4,033,213 A | | 7/1977 | Eiselt et al. |
| 4,164,162 A | | 8/1979 | Eiselt et al. |
| 4,413,540 A | | 11/1983 | Burge |
| 4,740,529 A | * | 4/1988 | Taka ............... B29C 61/003 521/134 |
| 5,786,406 A | * | 7/1998 | Uejyukkoku ......... C08J 9/0061 521/50.5 |
| 5,955,188 A | | 9/1999 | Pushaw |
| 6,209,430 B1 | | 4/2001 | Desmarais et al. |
| 6,383,687 B1 | | 5/2002 | Gibbons et al. |
| 6,936,327 B2 | * | 8/2005 | Zafiroglu ............ B32B 7/02 428/92 |
| 7,993,739 B2 | | 8/2011 | Barger et al. |
| 2002/0106503 A1 | | 8/2002 | Monk et al. |
| 2003/0003293 A1 | * | 1/2003 | Ramesh .............. B32B 5/18 428/319.3 |
| 2008/0072720 A1 | | 3/2008 | Potzsch et al. |
| 2010/0170632 A1 | * | 7/2010 | Gautriaud ............ B32B 25/08 156/244.17 |
| 2010/0215934 A1 | | 8/2010 | Mariezkurrena et al. |
| 2010/0272955 A1 | | 10/2010 | Chimelak et al. |

(Continued)

FOREIGN PATENT DOCUMENTS

| | | |
|---|---|---|
| CN | 101511578 A | 8/2009 |
| CN | 102655998 A | 9/2012 |

(Continued)

OTHER PUBLICATIONS

Extended European Search Report dated Sep. 5, 2017, from corresponding European Application No. 17164043.6.

The First Office Action dated Sep. 30, 2020, of counterpart Chinese Application No. 201710209322.0, along with an English translation.

(Continued)

*Primary Examiner* — Maria V Ewald
*Assistant Examiner* — Ethan Weydemeyer
(74) *Attorney, Agent, or Firm* — DLA Piper LLP (US)

(57) ABSTRACT

A method of manufacturing a polyolefin foam sheet composition includes extruding a polyolefin sheet, irradiating the extruded sheet to obtain a physically crosslinked sheet, foaming the physically crosslinked sheet with heat to obtain a foamed layer, and skiving the foamed layer to obtain a foam sheet with at least one skived surface. The surface roughness of the skived surface of the foam sheet is different from the surface roughness of an unskived surface.

32 Claims, No Drawings

(56) References Cited

U.S. PATENT DOCUMENTS

| | | |
|---|---|---|
| 2011/0014835 A1 | 1/2011 | Sieradzki et al. |
| 2011/0091688 A1 | 4/2011 | Maurer et al. |
| 2011/0200813 A1 | 8/2011 | Okura |
| 2012/0295086 A1 | 11/2012 | Baldwin et al. |
| 2013/0084429 A1 | 4/2013 | Mittag et al. |
| 2014/0033464 A1* | 2/2014 | Demirtas ............ B29C 44/5627 15/246 |
| 2015/0183142 A1 | 7/2015 | Baldwin et al. |
| 2015/0184400 A1 | 7/2015 | Baldwin et al. |
| 2015/0259492 A1 | 9/2015 | Zur et al. |

FOREIGN PATENT DOCUMENTS

| | | | |
|---|---|---|---|
| CN | 103648772 A | 3/2014 | |
| CN | 103937065 A | 7/2014 | |
| DE | 10 2011014 707 | 9/2012 | |
| EP | 1 072 367 | 1/2001 | |
| JP | 59-184629 | 10/1984 | |
| JP | 62-218100 | 9/1987 | |
| KR | 20140093178 A * | 7/2014 | ................ C08J 5/18 |
| WO | 2012/046743 | 4/2012 | |

OTHER PUBLICATIONS

The Second Office Action dated Apr. 8, 2021, of counterpart Chinese Application No. 201710209322.0, along with an English translation.

The Decision of Rejection dated Aug. 12, 2021, of counterpart Chinese Application No. 201710209322.0, along with an English translation.

* cited by examiner

METHODS OF PRODUCING POLYOLEFIN FOAM SHEETS AND ARTICLES MADE THEREOF

TECHNICAL FIELD

This disclosure relates to methods of continuously producing crosslinked closed cell polyolefin foam sheets. Some aspects of this disclosure relate to methods of continuously producing crosslinked closed cell polyolefin foam sheets with substantially dissimilar primary surfaces. Articles comprising the foam sheet are also disclosed.

BACKGROUND

Continuously produced crosslinked closed cell polyolefin foam sheets may be produced by extruding a blend of ingredients into a sheet, irradiating the sheet, then foaming the sheet. However, there are practical limitations in both equipment capability and cost that limit the range of thickness and density combinations attainable in this three step production method. For example, a very thin and very light foam sheet may be impractical for commercial production due to (a) the difficulty in extruding a thin sheet and (b) the cost associated with high levels of expensive chemical foaming agent required to obtain a very light foam sheet. Accordingly, there is a need for methods and materials capable of producing foams that are both very thin and very light that would otherwise not be feasible.

SUMMARY

We provide a method of manufacturing a polyolefin foam sheet composition comprising extruding a foaming agent and at least one polyolefin resin selected from the group consisting of a polypropylene and a polyethylene to obtain an unfoamed, extruded sheet; irradiating the extruded sheet with ionizing radiation to obtain a physically crosslinked sheet; foaming the physically crosslinked sheet with heat to obtain a foamed layer; and skiving the foamed layer to obtain a foam sheet with at least one skived surface. A skived surface of the foam sheet preferably has a Sa of about 20 to about 150 µm and an Sz of about 250 to about 1000 µm.

We also provide a crosslinked polyolefin foam sheet comprising at least one polyolefin resin selected from the group consisting of a polypropylene and a polyethylene, wherein a surface of the crosslinked foam sheet is skived to obtain at least one skived surface. The crosslinked polyolefin foam sheet may be used in connection with a flooring underlayment system, gasket, a foam tape and a window glazing system.

DETAILED DESCRIPTION

The methods and materials disclosed herein are capable of producing foams that are both very thin and very light that would otherwise not be feasible in the conventional three step production method. Additionally, the foams have a broadened range of thickness and density combinations compared to those now attainable, which allows for continuously produced crosslinked closed cell polyolefin foam sheets to be commercially viable and cost competitive to other commercial foams, such as non-crosslinked closed cell polyolefin foam sheets.

In addition, the foams allow for increased plant manufacturing capacity and efficiency. In a typical manufacturing environment, there is a push to increase efficiency and output capacity from the production process. One way to expand capacity is to install another production line. However, this is generally costly for the manufacturer and considered a "last resort" if other engineering solutions are not available.

We have discovered a unique method of increasing the output of a continuous manufacturing process that produces radiation crosslinked closed cell polyolefin foam sheet without having to install another production line. Output may be increased by two-fold, three-fold or even more by utilizing our methods which comprise a step of skiving. By skiving a continuously produced foam sheet that is double (2×) the desired commercial foam thickness, production output is essentially doubled. Likewise, by skiving a continuously produced foam sheet that is triple (3×) the desired commercial foam thickness, production output is essentially tripled. And so on with foam sheets that are four times, five times or more thicker than the desired commercial foam thickness. As a consequence of skiving, foam layers are produced with substantially dissimilar primary surfaces.

The methods of continuously producing crosslinked closed cell polyolefin foam sheet with dissimilar primary surfaces may optionally include the steps of (a) extrusion, (b) irradiation, (c) foaming, and (d) skiving.

In the extrusion step, raw materials of the foam composition can be fed into an extruder. The method of feeding ingredients into the extruder is based on the design of the extruder and the material handling equipment available. Preblending ingredients of the foam composition may be performed, if necessary or desired, to facilitate their dispersal. If performed, a Henshel mixer may be preferably used for preblending. Optionally, all ingredients can be preblended and fed thru a single port in the extruder. The ingredients can also be individually fed thru separate designated ports for each ingredient. For example, if the crosslinking agent or any other additive is a liquid, the agent and/or additives can be added through a feeding gate (or gates) on the extruder or through a vent opening on the extruder (if equipped with a vent) instead of being preblended with solid ingredients. Combinations of "preblending" and individual ingredient port feeding can also be employed. Exemplary extrusion techniques are also disclosed in Chapter 8 of Handbook of Polymeric Foam and Foam Technology (2nd Edition, edited by Daniel Klempner and Vahid Sendijarevic), the subject matter of which is incorporated herein by reference.

The raw materials of the foam composition fed into the extruder can include at least one polypropylene having a melt flow index from about 0.1 to about 25 grams per 10 minutes at 230° C. and/or at least one polyethylene having a melt flow index from about 0.1 to about 25 grams per 10 minutes at 190° C. In some examples, the melt flow index of the polypropylene(s) and/or polyethylene(s) can preferably be from about 0.3 to about 20 grams per 10 minutes at 230° C. and at 190° C., respectively, and more preferably from about 0.5 to about 15 grams per 10 minutes at 230° C. and at 190° C., respectively.

Optionally, the foam composition comprises a blend of the above mentioned polypropylene and polyethylene. A suitable ratio of the polypropylene to polyethylene in the blend is 30/70 to 90/10, or more preferably 40/60 to 80/20. Alternatively, the foam composition may be 100% polyethylene or 100% polypropylene.

The "melt flow index" (MFI) value for a polymer is defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

The MFI provides a measure of flow characteristics of a polymer and is an indication of the molecular weight and processability of a polymer material. If the MFI values are too high, which corresponds to a low viscosity, extrusion may not be satisfactorily carried out. Problems associated with MFI values that are too high include low pressures during extrusion, problems setting the thickness profile, uneven cooling profile due to low melt viscosity, poor melt strength, machine problems, or a combination thereof. Problems with MFI values that are too low include high pressures during melt processing, sheet quality and profile problems, and higher extrusion temperatures which cause a risk of foaming agent decomposition and activation.

The above MFI ranges are also important for foaming processes because they reflect the viscosity of the material and the viscosity has an effect on the foaming. Without being bound by any theory, it is believed there are several reasons why particular MFI values are more effective than others. A lower MFI material may improve some physical properties as the molecular chain length is greater, creating more energy needed for chains to flow when a stress is applied. Also, the longer the molecular chain (MW), the more crystal entities the chain can crystallize thus providing more strength through intermolecular ties. However, at too low an MFI, the viscosity becomes too high. On the other hand, polymers with higher MFI values have shorter chains. Therefore, in a given volume of a material with higher MFI values, there are more chain ends on a microscopic level relative to polymers having a lower MFI, which can rotate and create free volume due to the space needed for such rotation (e.g., rotation occurring above the Tg, or glass transition temperature of the polymer). This increases the free volume and enables an easy flow under stress forces.

Polypropylene(s) with suitable MFI values may include, but are not limited to, polypropylene, impact modified polypropylene, polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend. Furthermore, the polypropylenes may be grafted with maleic anhydride.

Polyethylene(s) with suitable MFI values may include, but are not limited to, LDPE, LLDPE (homopolymer, copolymer with butene or hexene or octene, terpolymer with butene and/or hexene and/or octene), VLDPE (homopolymer, copolymer with butene or hexene or octene, terpolymer with butene and/or hexene and/or octene), VLLDPE (homopolymer, copolymer with butene or hexene or octene, terpolymer with butene and/or hexene and/or octene), HDPE, polyethylene-propylene copolymer, metallocene polyethylene, metallocene ethylene-propylene copolymer, and metallocene polyethylene olefin block copolymer (with a controlled block sequence), any of which may contain grafted compatibilizers or copolymers that contain acetate and/or ester groups. The polyethylene(s) may be grafted with maleic anhydride. The polyethylene(s) may also be copolymers and terpolymers containing acetate and/or ester groups and may be copolymer and terpolymer ionomers containing acetate and/or ester groups.

Since a broad range of skived foam layers, articles, and laminates can be created with the disclosed foam composition, a broad range of polypropylenes and polyethylenes can be employed in the foam composition to meet the various end use requirements of skived foam layers, articles, and laminates.

Optionally, the raw materials of the foam composition fed into the extruder may also contain additives compatible of producing the disclosed foam structure. Common additives may include, but are not limited to, organic peroxides, antioxidants, lubricants, thermal stabilizers, colorants, flame retardants, antistatic agents, nucleating agents, plasticizers, antimicrobials, antifungals, light stabilizers, UV absorbents, anti-blocking agents, fillers, deodorizers, thickeners, cell size stabilizers, metal deactivators, and combinations thereof.

Regardless of how the ingredients are fed into the extruder, the shearing force and mixing within the extruder must be sufficient to produce a substantially homogenous structure. Optionally, co-rotating and counter-rotating twin screw extruders can provide sufficient shearing force and mixing thru the extruder barrel to extrude a structure with uniform properties.

Specific energy is an indicator of how much work is being applied during extrusion of the ingredients and how intensive the extrusion process is. Specific energy is defined as the energy applied to a material being processed by the extruder, normalized to a per kilogram basis. The specific energy is quantified in units of kilowatts of applied energy per total material fed in kilograms per hour. Specific energy is calculated according to the formula:

$$\text{Specific Energy} = \frac{\text{KW(applied)}}{\text{feedrate}\left(\frac{\text{kg}}{\text{hr}}\right)},$$

Where:

$$\text{KW(applied)} = \frac{\begin{array}{c}\text{KW(motor rating)} * \\ (\% \text{ torque from maximum allowable}) * \\ \text{RPM(actual running RPM)}\end{array}}{\text{Max RPM(capability of extruder)} * 0.97(\text{gearbox efficiency})}.$$

Specific energy is used to quantify the amount of shearing and mixing of the ingredients within the extruder. The extruders are preferably capable of producing a specific energy of at least about 0.090 kW·hr/kg, preferably at least about 0.105 kW·hr/kg, and more preferably at least about 0.120 kW·hr/kg.

The foam composition can include a variety of different chemical blowing agents. Examples of chemical blowing agents may include, but are not limited to, azo compounds, hydrazine compounds, carbazides, tetrazoles, nitroso compounds and carbonates. In addition, a chemical blowing agent may be employed alone or in any combination.

One chemical foaming agent that can be used in some examples is azodicarbonamide ("ADCA"). A suitable amount of ADCA in the foam composition can be less than or equal to about 40% PPHR. ADCA's thermal decomposition typically occurs at temperatures of about 190 to about 230° C. To prevent ADCA from thermally decomposing in the extruder, the extruding temperature may be maintained at or below about 190° C. Another chemical foaming agent that can be used in some examples is p-toluenesulfonyl hydrazide ("TSH"). A suitable amount of TSH in the foam composition can be less than or equal to about 77% PPHR. Another chemical foaming agent that can be used in some examples is p-toluenesulfonyl semicarbazide ("TSS"). A suitable amount of TSS in the foam composition can be less than or equal to about 63% PPHR. The amount of chemical foaming agent is not particularly limited and can depend on the unfoamed sheet thickness, the desired foam thickness, desired foam density, materials being extruded, crosslinking percentage, type of chemical foaming agent (different foaming agents can significantly generate different quantities of gas), among others. Suitable amounts of foaming agent may generally be less than about 80% PPHR.

The extrusion temperature of the structure is preferably at least 10° C. below the thermal decomposition initiation temperature of the chemical blowing agent. If the extrusion temperature exceeds the thermal decomposition temperature of the blowing agent, then the blowing agent tends to decompose, resulting in undesirable "prefoaming." A suitable extrusion temperature may also be at least 15° C. below the thermal decomposition initiation temperature of the chemical foaming agent, and even more preferably at least 20° C. below the thermal decomposition initiation temperature of the chemical foaming agent.

If the difference between the decomposition temperature of the thermally decomposable foaming agent and the melting point of the polymer with the highest melting point is high, then a catalyst for foaming agent decomposition may be used. Exemplary catalysts may include, but are not limited to, zinc oxide, magnesium oxide, calcium stearate, glycerin, and urea.

The lower temperature limit for extrusion is that of the polymer with the highest melting point. A suitable lower temperature limit for extrusion may be at least 5° C. above the melting point of the polymer with the highest melting point, and more preferably at least 10° C. above the melting point of the polymer with the highest melting point.

If the extrusion temperature drops below the melting temperature of the polymer with the highest melting point, then undesirable "unmelts" appear in the extruded sheet. Upon foaming, a sheet that was extruded below this lower temperature limit will exhibit uneven thickness, a non-uniform cell structure, pockets of cell collapse, and other undesirable attributes.

In general, a suitable extrusion temperature range may be about 138 to about 190° C., preferably about 143 to about 185° C., and more preferably about 148 to about 180° C.

The thickness of the extruded sheet may be about 0.1 to about 30 mm, preferably from about 0.2 to about 25 mm, more preferably from about 0.3 to about 20 mm, and even more preferably from about 0.4 to about 15 mm.

The extruded sheet should not be foamed during extruding. Extruding an unfoamed sheet is different from extruding a foamed sheet, commonly referred to as "extrusion foaming." Typical extrusion foaming generates polyolefin foam with unskived surfaces that are significantly rougher than equivalent foam produced by the method of first extruding an unfoamed sheet, wherein foaming occurs post-extrusion. Rougher surfaces of extrusion foamed sheets are generally caused by the presence of larger sized cells when compared to foams produced by the method of first extruding an unfoamed sheet. Although the cell size and size distribution of a foam sheet may not be critical in some commercial applications, since surface roughness is a function of cell size, foams with larger cells may be less desirable than foam sheets with smaller cells for applications utilizing a smooth foam surface.

After the sheet has been produced by the extruder, the extruded sheet can be subjected to irradiation with ionizing radiation to crosslink the composition of the extruded sheet, thereby obtaining an irradiated, physically crosslinked sheet. Exemplary irradiation techniques are disclosed in Chapter 8 of Handbook of Polymeric Foam and Foam Technology (2nd Edition, edited by Daniel Klempner and Vahid Sendijarevic).

Ionizing radiation is often unable to produce a sufficient degree of crosslinking on polypropylene(s), polypropylene based materials, some polyethylene(s), and some polyethylene based materials. Thus, a crosslinking agent may optionally be added to the foam composition that is fed into the extruder to promote crosslinking.

Examples of ionizing radiation may include, but are not limited to, alpha rays, beta rays (electron beams), and gamma rays. Among them, an electron beam having uniform energy is preferably used to prepare the crosslinked structures. Exposure time, frequency of irradiation, and acceleration voltage upon irradiation with an electron beam can vary widely depending on the intended crosslinking degree and the thickness of the extruded structure. However, the ionizing radiation should generally be about 10 to about 500 kGy, preferably about 20 to about 300 kGy, and more preferably about 20 to about 200 kGy. If the exposure is too low, then cell stability may not be maintained upon foaming. If the exposure is too high, moldability of the resulting foam structure may be poor. Moldability is a desirable property when the foam structure is used in thermoforming applications. Also, the structure may be softened by exothermic heat release upon exposure to the electron beam radiation such that the structure can deform when the exposure is too high. In addition, the polymer components may also be degraded from excessive polymer chain scission.

The extruded sheet may be irradiated up to 4 separate times or 3 separate times, but preferably no more than twice, and more preferably only once. If the irradiation frequency is more than about 4 times, the polymer components may suffer degradation so that upon foaming, for example, uniform cells will not be created in the resulting foam.

The penetration depth of ionizing radiation is function of the acceleration voltage, measured in units of kV. When the ionizing radiation are beta rays (electron beams), typical commercial electron beam irradiation machines can penetrate an extruded sheet of about 15 mm (about 3000 kV) with good uniformity. When the thickness of the extruded sheet is greater than about 15 mm, irradiating each primary surface of the profile with beta rays (electron beams) is preferred to make the degree of crosslinking of the primary surfaces(s) and the inner layer more uniform.

Irradiation with an electron beam provides an advantage in that extruded sheets having various thicknesses can be effectively crosslinked by controlling the acceleration voltage of the electrons. The acceleration voltage is generally about 200 to about 3000 kV, preferably from about 400 to about 2000 kV, and more preferably about 600 to about 1000 kV. If the acceleration voltage is less than about 200 kV, then the radiation cannot reach the inner portion of the extruded sheet. As a result, the cells in the inner portion can be coarse and uneven on foaming. Additionally, acceleration voltage that is too low for a given thickness profile will cause arcing, resulting in "pinholes" or "tunnels" in the foamed structure. Regardless of the type of ionizing radiation selected, crosslinking is performed so that the extruded sheet is crosslinked about 20 to about 75%, preferably about 30 to about 60%, as measured by the "TORAY™ Gel Fraction Method."

According to the "TORAY™ Gel Fraction Method," tetralin solvent is used to dissolve non-crosslinked components in a composition. In principle, the non-crosslinked material is dissolved in tetralin and the crosslinking degree is expressed as the weight percentage of crosslinked material in the entire composition.

The apparatus used to determine the percent of polymer crosslinking in the "TORAY™ Gel Fraction Method" may include: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, 100 milligrams±5 milligrams of sample is weighed out and transferred to the wire mesh bag. The weight of the wire mesh bag and the sample, typically in the form of foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded.

Crosslinking is then calculated using the formula 100*(C−A)/(B−A), where A=empty wire mesh bag weight; B=wire bag weight+foam sample before immersion in tetralin; and C=wire bag weight+dissolved sample after immersion in tetralin.

Suitable crosslinking agents may include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking agents may be used alone or in any combination. Divinylbenzene (DVB), a difunctional liquid crosslinking monomer, can be used as a crosslinking agent and added to the extruder at a level no greater than about 4% PPHR.

Crosslinks may be generated using a variety of different techniques and can be formed both intermolecularly, between different polymer molecules, and intramolecularly, between portions of a single polymer molecule. Such techniques include, but are not limited to, providing crosslinking agents which are separate from a polymer chain and providing polymer chains which incorporate a crosslinking agent containing a functional group which can form a crosslink or be activated to form a crosslink.

The extruded sheet should be "physically crosslinked." Physical crosslinking differs from chemical crosslinking. In chemical crosslinking, the crosslinks can be generated with crosslinking promoters, but without the use of ionizing radiation. Regardless of the chemical crosslinking process, chemically crosslinked foam sheets typically exhibit surfaces significantly rougher than equivalent foam sheets produced by physical crosslinking. Rougher surfaces of chemically crosslinked foam sheets are generally caused by larger sized cells when compared to foams produced by using physical crosslinking. Although the cell size and size distribution of a foam sheet may not be critical in some commercial applications, since surface roughness is a function of cell size, foams with larger cells may be less desirable than foam sheets with smaller cells for applications utilizing a smooth foam surface.

After irradiating the extruded sheet, foaming may be accomplished by heating the crosslinked sheet to a temperature higher than the decomposition temperature of the thermally decomposable blowing agent. For the thermally decomposable blowing agent azodicarbonamide, the foaming is performed at about 200 to about 260° C., preferably about 220 to about 240° C., in a continuous process. A continuous foaming process is preferred over a batch process for production of a continuous foam sheet.

Foaming is typically conducted by heating the crosslinked sheet with molten salt, radiant heaters, vertical hot air oven, horizontal hot air oven, ultrasonic energy, microwave energy, or a combination of these methods. Foaming may also be conducted in an impregnation process using, for example, nitrogen in an autoclave, followed by a free foaming via molten salt, radiant heaters, vertical hot air oven, horizontal hot air oven, microwave energy, or a combination of these methods. Exemplary foaming techniques are disclosed in Chapter 8 of Handbook of Polymeric Foam and Foam Technology (2nd Edition, edited by Daniel Klempner and Vahid Sendijarevic).

Optionally, before foaming, the crosslinked sheet can be softened with preheating. This helps stabilize the expansion of the sheet upon foaming. Preheating can be performed by dipping the crosslinked sheet in hot water or exposing the crosslinked sheet to radiant heat.

After foaming the crosslinked sheet, skiving may be accomplished by continuously cutting or slicing the continuous foamed sheet into two or more layers. A mechanical blade may be employed as the cutter. The blade may be mobile or stationary. When the skiving machine is such that the blade is mobile, the blade movement may be unidirectional, circular, or reciprocating. Regardless whether the blade is mobile or stationary, the blade may be positioned such that cutting is parallel to the primary surfaces, preferably without the foam sheet vibrating or bunching at the cutting blade.

Suitable skiving speed (i.e., processing speed, input speed or output speed) can be about 0.0 m/min to about 30.0 m/min. The blade speed can be about 1.7 m/sec to about 5.0 m/sec.

A skived foam sheet has two opposing primary surfaces (e.g., upper and lower surfaces) and one or both of the surfaces may be skived. If one of the surfaces of the foam sheet is not skived, the unskived surface has the surface characteristics of the foamed layer. For example, the unskived surface may have the surface characteristics brought about by exposure to radiant heaters or contact with molten salt during the foaming process. A skived surface generally has surface properties differing from an unskived surface of the same foam layer.

Surface properties may be measured by axial chromatism technique utilizing non-contact profilometer, such as the NANOVEA™ ST400 Profilometer. The Arithmetical Mean Height (Sa) of the foam sheet surface is the mean surface roughness determined from the following expression:

$$Sa = \frac{1}{A} \int \int_A |z(x, y)| dx dy.$$

The maximum height (Sz), or height between the highest peak and deepest valley may also be measured.

The Sa of a skived surface of the foam sheet may be about 20 to about 150 µm, more preferably from about 40 to about 130 µm and even more preferably about 50 to about 120 µm. The Sz of a skived surface of the foam sheet may be about 250 to about 1000 µm, more preferably from about 300 to about 750 µm.

The surface roughness of an unskived layer will depend on the conditions that the surface was exposed to during processing, such as, for example, whether the unskived surface faced a radiant heater during foaming, contacted molten salt during foaming, contacted the belt in the heating oven during foaming, or contacted an idler or cooling drum before the surface solidifies. Generally, the Sa of an unskived surface of the foam sheet may be about 5 to about 30 µm, more preferably about 9 to about 26 µm. The Sz of an unskived surface of the foam sheet may be about 90 to about 350 µm, more preferably about 100 to about 135 µm. More specifically, the Sa of an unskived surface of a foam sheet exposed to a radiant heater during foaming may be about 9 to about 11 µm and the Sz may be about 110 to about 130 µm. The Sa of an unskived surface of a foam sheet that contacted molten salt during foaming may be about 9 to about 26 µm and the Sz may be about 112 to about 350 µm.

Generally, where a foam sheet has both an unskived and a skived surface, the surface roughness of the skived surface of a foam sheet may be greater than the surface roughness of the unskived surface of the foam sheet. For example, the Sa of a skived surface of a foam sheet may be at least about 2.5 times or even at least about 3 times the Sa of the unskived surface. Likewise, the Sz of a skived surface of a foam sheet may be at least about 1.5 times or even at least about 2 times the Sz of the unskived surface. If the unskived surface is a surface exposed to radiant heating and a cooling drum during foaming, the Sa of the skived surface may be at least about 3 times or even at least about 5 times the Sa of the unskived surface. Likewise, the Sz of a skived surface of the foam sheet may be at least about 2 times or even at least about 3 times the Sz of the unskived surface exposed to radiant heating and a cooling drum during foaming. If the unskived surface is a surface that contacted a molten salt bath during foaming, the Sa of the skived surface may be at least about 2.5 times the Sa of the unskived surface and the Sz of the skived surface of a foam sheet may be at least about 1.5 times the Sz of the unskived surface exposed to the molten salt bath.

The density of any skived foam layer is defined and measured using section or "overall" density, rather than a "core" density, as measured by JIS K6767. Skived foam layers produced using the above described method preferably yield foams with a section, or "overall" density of about 0.015 to about 0.250 g/cm³, preferably about 0.030 to about 0.175 g/cm³. The section density can be controlled by the amount of blowing agent and the thickness of the extruded structure. If the density of a skived foam layer is less than about 0.015 g/cm³, then the irradiated structure does not foam efficiently due to a large amount of chemical blowing agent needed to attain the density. Additionally, if the density of a skived foam layer is less than about 0.015 g/cm³, then the expansion of the irradiated structure during the foaming step becomes increasingly difficult to control. Furthermore, if the density of a skived foam layer is less than about 0.015 g/cm³, then the foam structure becomes increasingly prone to cell collapse during the foaming step. Thus, it is difficult to produce a skived foam layer of uniform section density and thickness at a density less than about 0.015 g/cm³.

A skived foam layer is not limited to a section density of about 0.250 g/cm³ or less. A skived foam layer of about 0.350 g/cm³ or less, about 0.450 g/cm³ or less, or about 0.550 g/cm³ or less may also be produced. However, it is preferred that the skived foam layer have a density of less than about 0.250 g/cm³ since greater densities are generally cost prohibitive when compared to other materials which can be used in a given application.

Skived foam layers produced using the above method may have closed cells. Preferably, at least about 90% of the cells have undamaged cell walls, preferably at least about 95%, and more preferably more than about 98%. The average cell size is about 0.05 to about 1.0 mm, and preferably about 0.1 to about 0.7 mm. If the average cell size is lower than about 0.05 mm, then the density of a skived foam layer is typically greater than about 0.250 g/cm³. If the average cell size is larger than about 1 mm, then the unskived foam surface may be too uneven and/or the skived foam surface may be too uneven. There is also a possibility of a skived foam layer being undesirably torn if the population of cells in the skived foam layer does not have a suitable average cell size. This can occur when the skived foam layer is stretched or when portions of it are subjected to a secondary process. When a foam layer has one skived and one unskived surface, the cell size in the foam layer may have a bimodal distribution representing a population of cells in the bulk the foam layer which are relatively round and a population of cells in the unskived surface which are relatively flat, thin, and/or oblong.

The thickness of a skived foam layer is about 0.2 mm to about 125 mm, preferably about 0.4 mm to about 50 mm, more preferably about 0.6 mm to about 25 mm, and even more preferably about 0.8 mm to about 12 mm or more preferably about 0.8 to about 3.2 mm. If the thickness is less than about 0.2 mm, then the foaming step is not efficient due to significant gas loss from the primary surfaces. If the thickness is greater than about 125 mm, expansion during the foaming step becomes increasingly difficult to control. Thus, it is increasingly more difficult to produce a skived foam layer with uniform section density and thickness.

Skiving the foam layer allows for the production of a crosslinked closed cell polyolefin foam sheet with substantially dissimilar primary surfaces.

Skived foam layers can be used in a variety of applications. One application is foam tapes and gasketing. Closed cell foam tape is commonly used in areas such as window glazing, where strips of foam tape are placed between two window panes to seal the air between the glass. This improves the thermal insulation property of the window. The foam also acts as a cushion for the glass panes from the effects of thermal expansion and contraction of the building and window frame from daily and seasonal temperature changes. Likewise, closed cell foam gaskets are commonly used for sealing and cushioning. Handheld electronic devices and household appliances are two examples that may contain foam gaskets. A soft, flexible skived foam layer is usually suited as a tape or gasket.

When the skived foam layer is to be used as a tape or gasket, a pressure sensitive adhesive layer may be disposed on at least a portion of one or both major surfaces. Any pressure sensitive adhesive known in the art may be used. Examples of such pressure sensitive adhesives may include, but are not limited to, acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The skived foam layer can also be thermoformed. To thermoform a skived layer, the foam is heated to the melting point of the polyolefin blend. If the blend has immiscible polymers, the blend may exhibit more than one melting point. In this case, the skived foam layer can typically be thermoformed when the foam is heated to a temperature midway between the foam composition's lowest melting point and highest melting point.

One example of a thermoformed article is an automobile air duct. A closed cell skived foam layer is particularly suited for this application due to its lower weight (when compared to solid plastic), its insulating properties that help maintain the temperature of the air flowing thru the duct, and its resistance to vibration (versus solid plastic). A firm skived foam layer is suited for an automobile air duct.

In some examples, skived foam structures are laminates containing a first layer of the skived foam and a second layer. In these laminates, the skived foam layer can, for example, be combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather and/or fiber layers such as non-wovens. Such layers may be manufactured using standard techniques that are well known to those skilled in the art. Importantly, the skived foam layer of the disclosure may be laminated on one or both sides with these materials and may include multiple layers.

In these laminates, a layer may be joined to an adjacent layer by chemical bonds, mechanical means and/or combinations of these. Adjacent laminate layers may also be affixed to each other by other means including the use of attractive forces between materials having opposite electromagnetic charges or attractive forces present between materials which both have either a predominantly hydrophobic character or a predominantly hydrophilic character.

In some examples, the skived foam layers or laminates are used in automobile interior parts such as door panels, door rolls, door inserts, door stuffers, trunk stuffers, armrests, center consoles, seat cushions, seat backs, headrests, seat back panels, instrument panels, knee bolsters, headliner and the like. These skived foam layers or laminates can also be used in furniture (e.g., commercial, office, and residential furniture) such as chair cushions, chair backs, sofa cushions, sofa trims, recliner cushions, recliner trims, couch cushions, couch trim, sleeper cushions, sleeper trims and the like. These skived foam layers or laminates can also be used in walls such as modular walls, moveable walls, wall panels, modular panels, office system panels, room dividers, portable partitions and the like. These skived foam layers or laminates can also be used in storage casing (e.g., commercial, office and residential) which is either mobile or stationary. The skived foam layers or laminates can also be used in luggage. Furthermore, the skived foam layers or laminates can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings, architectural coverings and the like.

Some examples include a first layer of the disclosed skived foam and a second layer selected from the group consisting of a solid hardwood floor panel, an engineered wood floor panel, a laminate floor panel, a vinyl floor tile, a ceramic floor tile, a porcelain floor tile, a stone floor tile, a quartz floor tile, a cement floor tile, and a concrete floor tile.

In these examples, the first layer may be joined to the adjacent panel or tile by chemical bonds, mechanical means and/or combinations of these. The adjacent laminate layers may also be affixed to each other by other means including the use of attractive forces between materials having opposite electromagnetic charges or attractive forces present between materials which both have either a predominantly hydrophobic character or a predominantly hydrophilic character.

A suitable method of attaching a skived foam layer to a floor panel—particularly a solid hardwood floor panel, an engineered wood floor panel, and a laminate floor panel—is via a pressure sensitive adhesive layer that is disposed on at least a portion of the foam surface and/or panel surface. Any pressure sensitive adhesive known in the art may be used. Examples of such pressure sensitive adhesives are acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The skived foam layer attached to the floor panel—particularly a solid hardwood floor panel, an engineered wood floor panel, and a laminate floor panel—serves several purposes. The skived foam can reduce the reflected sound level when the panel is impacted, for example, when walking on the panel with boots or high heeled shoes. The skived foam can also act as a moisture vapor barrier between the panel and sub-floor and can help provide a more uniform laydown among multiple panels since any unevenness, bumps, or spikes (for example a protruding nailhead) on the sub-floor will be buffered by the skived foam. These floor panels and tiles are commonly installed in residential homes, office buildings, and other commercial buildings.

We also provide a flooring system including: a top floor layer; a sub-floor layer; and one or more underlayment layers where at least one of the underlayment layers contains the skived foam layer disposed between the sub-floor and the top floor layer.

In this system, the skived foam layer may or may not be joined to any adjacent layer, including the sub-floor or the top floor layer. When any layer in the disclosed system is joined, the attachment may be performed by means of chemical bonds, mechanical means and/or combinations of these. The adjacent layers may also be affixed to each other by any other means including the use of attractive forces between materials having opposite electromagnetic charges or attractive forces present between materials which both have either a predominantly hydrophobic character or a predominantly hydrophilic character.

If any layers are attached, a suitable method of attachment is the use of either a one component urethane adhesive, a two component urethane adhesive, a one component acrylic adhesive, or a two component acrylic adhesive. The adhesive is typically applied during the installation of the system in residential homes, office buildings, and commercial buildings.

The skived foam layer in this system serves several purposes. The foam can reduce the reflected sound level when the top floor layer is impacted, for example, when walking on the panel with boots or high heeled shoes. The foam can also act as a moisture vapor barrier between the panel and sub-floor and help provide a more uniform lay-down among multiple panels since any unevenness, bumps, or spikes (for example a protruding nailhead) on the sub-floor will be buffered by the foam. For cases where the top floor layer is composed of ceramic floor tiles, porcelain floor tiles, stone floor tiles, quartz floor tiles, cement floor tiles, and concrete floor tiles connected by grout and where all layers in the flooring system are joined, the skived foam can help reduce grout fracturing by buffering varying thermal expansions and contractions of the various layers in the system.

To satisfy the requirements of any of the above applications, the skived foam layer may be subjected to various secondary processes, including and not limited to, embossing, corona or plasma treatment, surface roughening, surface smoothing, perforation or microperforation, splicing, slicing, additional skiving, layering, bonding, and hole punching.

EXAMPLES

Surface characteristics of the Examples were tested using a Nanovea ST400 3D Profilometer. Probe specifications and measurement parameters can be found in Tables 1 and 2 below.

TABLE 1

| Optical Pen Specifications | | |
| --- | --- | --- |
| Measurement Range | P1-OP1200C | P1-OP3500C |
| Z Resolution (nm) | 20 | 50 |
| Z Accuracy (nm) | 200 | 300 |
| Lateral Resolution (μm) | 4.0 | 4.0 |

TABLE 2

| Measurement Parameters | | |
| --- | --- | --- |
| Optical Pen | P1-OP1200C | P1-OP3500C |
| Acquisition rate | 100-1850 Hz | 800-1850 Hz |
| Averaging | 1 | 1 |
| Measured surface | 3 mm × 3 mm to 10 mm × 10 mm | 10 mm × 10 mm |
| Step size | 4 μm × 4 μm to 10 μm × 15 μm | 10 μm × 15 μm |
| Measurement Time (h:m:s) | 00:49:41 to 00:54:11 | 00:50:21 |

Example 1

Example 1 is an 80/20 polypropylene/polyethylene blend formulated and foamed to produce foam layers of 0.155-0.175 g/cm$^3$ as set forth in Table 3. The foaming method included heating the crosslinked unfoamed sheet via molten salt and radiant heaters. Example 1 was measured with Opitcal Pen P1-OP1200C. Essentially two dissimilar surfaces were produced when the crosslinked foamed sheet was skived once in a machine incorporating a unidirectional bandsaw type blade as the cutting mechanism:
Smoother (unskived) surfaces: Sa=10 μm Sz=110-130 μm
Rougher (skived) surfaces: Sa=50-70 μm Sz=340-390 μm

Example 2

Example 2 is also an 80/20 polypropylene/polyethylene blend but formulated and foamed to produce significantly lighter foam layers of 0.030-0.050 g/cm$^3$ as set forth in Table 3. Example 2 was measured with Opitcal Pen P1-OP1200C. Essentially three dissimilar surfaces were produced when the crosslinked foamed sheeted was skived once in a machine incorporating a unidirectional bandsaw type blade as the cutting mechanism:
Smoothest (unskived surface where material faced radiant heaters while foaming):
    Sa=10 μm Sz=130 μm
Medium (unskived surface where material contacted molten salt while foaming):
    Sa=20 μm Sz=220 μm
Roughest (skived) surfaces:
    Sa=60-90 μm Sz=400-570 μm

Example 3

Example 3 is a 40/60 polypropylene/polyethylene blend as set forth in Table 3, formulated and foamed to produce even lighter foam layers (0.025-0.045 g/cm$^3$) versus Examples 1 and 2. Example 3 was measured with Opitcal Pen P1-OP1200C. Essentially three dissimilar surfaces were produced when the crosslinked foamed sheeted was skived once in a machine incorporating a unidirectional bandsaw type blade as the cutting mechanism:
Smoothest (unskived surface where material faced radiant heaters while foaming):
    Sa=10 μm Sz=110 μm
Medium (unskived surface where material contacted molten salt while foaming):
    Sa=30 μm Sz=350 μm
Roughest (skived) surfaces:
    Sa=80 μm Sz=550-670 μm

Example 4

Example 4 is similar to Example 2 in that it is an 80/20 polypropylene/polyethylene blend formulated and foamed to produce foam layers of 0.030-0.050 g/cm3 as set forth in Table 3. However, unlike Examples 1-3, the foaming method for Example 4 included heating the crosslinked unfoamed sheet via hot air and radiant heaters in a horizontal oven. Example 4 was measured with Opitcal Pen P1-OP3500C. Essentially three dissimilar surfaces were produced when the crosslinked foamed sheeted was skived twice in a machine incorporating a unidirectional bandsaw type blade as the cutting mechanism:
Smoothest (unskived surface where material faced hot air while foaming):
    Sa=10 μm Sz=110 μm
Medium (unskived surface where material contacted oven belt):
    Sa=20 μm Sz=150 μm
Roughest (skived) surfaces:
    Sa=110-120 μm Sz=620-720 μm

Example 5

Example 5 is similar to Examples 1, 2, and 4 in that it is an 80/20 polypropylene/polyethylene blend as set forth in Table 3. However, the material was formulated and foamed to produce foam layers of 0.045-0.065 g/cm³. Unlike Examples 1-4, the foaming method for Example 5 included heating the crosslinked unfoamed sheet via hot air and radiant heaters in a vertical oven. Example 5 was measured with Opitcal Pen P1-OP1200C. Essentially two dissimilar surfaces were produced when the crosslinked foamed sheeted was skived once in a machine incorporating a unidirectional bandsaw type blade as the cutting mechanism:
Smoother (unskived) surfaces: Sa=10 μm Sz=110 μm
Rougher (skived) surfaces: Sa=60 μm Sz=390-410 μm

Example 6

Example 6 demonstrates the effects of extrusion foaming compared to foaming after extrusion on the surface properties of an unskived surface. A polyethylene extrusion foamed sheet (a 0.025-0.026 g/cm3 pool liner wall foam commercially available from the Gladon Company (Oak Creek, Wis.) ("38064 blue Gladon")) was compared to two 0.025-0.026 g/cm polyethylene foam sheets. The first sheet was Toraypef® 40100-AG00 commercially produced by Toray Industries, Inc (Shiga, JP). The 40100-AG00 was foamed by heating the radiation crosslinked sheet with hot air. The second sheet was Toraypef® 40064LCE-STD produced by Toray Plastics (America), Inc. The 40064LCE-STD was foamed by heating the radiation crosslinked sheet by molten salt on one surface and radiant heat on the other surface. The surface characteristics of the sheets were tested using a Nanovea ST400 3D Profilometer. Regardless of the heating method, the extrusion foamed material (38064 blue Gladon) was significantly rougher (exhibiting a mean surface roughness (Sa) of 83.9 μm and a maximum height (height between the highest peak and the deepest valley) (Sz) of 706 μm) than the extruded then foamed sheets (40100-AG00 & 40064LCE-STD) (exhibiting a mean surface roughness (Sa) of 20.7-65.2 μm and a maximum height (Sz) of 237-592 μm).

Example 7

Example 7 demonstrates the effects of physical crosslinking with chemical crosslinking on the surface properties of an unskived surface. The surface of a 0.067 g/cm3 chemically crosslinked polyolefin foam sheet (ProGame™ XC-Cut 7010 commercially produced by Trocellen Group of Companies) was compared to two 0.067 g/cm physically crosslinked polypropylene/polyethylene blended foam sheets (Toraypef® 15030AC17-STD & ToraSoft® 15030SR18-STD). Both the chemically crosslinked foam and the physically crosslinked foams were foamed in a post-extrusion process. The chemically crosslinked foam (XC-Cut 7010) exhibited a mean surface roughness (Sa) of 89.5 μm and a maximum height (Sz) of 856 μm. The physically crosslinked foams exhibited a mean surface roughness (Sa) of 7.63-23.9 μm and a maximum height (Sz) of 81.0-273 μl. Thus, the physically crosslinked foams exhibit significantly smoother surfaces versus the chemically crosslinked foam.

TABLE 3

| | | Formulation Parameters | | | Extrusion Parameters | | | | Irradiation Parameters | |
|---|---|---|---|---|---|---|---|---|---|---|
| | ingredient | grade | quantity | preblended or directly fed? | twin-screw extrusion: counter or co-rotating? | extrusion temperature | specific energy of extrusion | nominal unfoamed sheet thickness | irradiation voltage | irradiation dosage |
| Example 1 | PP-PE RCP | 7250FL | 80% | preblended | counter rotating | 153° C. | 0.147 kW/(kg/hr) | 1.175 mm | 600 kV | 53.8 kGy |
| | LLDPE-hexene cop | LLP8501.67 | 20% | | | | | | | |
| | ADCA | Unifoam AZ TC-181 | 3.0% PPHR | | | | | | | |
| | DVB (80% pure) | DVB HP | 2.4% PPHR | | | | | | | |
| | antioxidant MB, LDPE carrier | "PR087" | 3.0% PPHR | | | | | | | |
| | black MB, LDPE carrier | TPM9527 | 3.2% PPHR | directly fed | | | | | | |
| Example 2 | PP-PE RCP | 7250FL | 80% | preblended | counter rotating | 161° C. | 0.174 kW/(kg/hr) | 2.050 mm | 900 kV | 48.0 kGy |
| | LLDPE-hexene cop | LLP8501.67 | 20% | | | | | | | |
| | ADCA | Unifoam AZ TC-181 | 10.0% PPHR | | | | | | | |
| | DVB (80% pure) | DVB HP | 2.4% PPHR | | | | | | | |
| | antioxidant MB, LDPE carrier | "PR087" | 3.0% PPHR | | | | | | | |
| | green MB, LDPE carrier | PM62752 | 3.2% PPHR | directly fed | | | | | | |
| Example 3 | PP-PE RCP | 7250FL | 40% | preblended | counter rotating | 152° C. | 0.171 kW/(kg/hr) | 1.150 mm | 700 kV | 44.6 kGy |
| | LLDPE-hexene cop | LLP8501.67 | 50% | | | | | | | |
| | ADCA | Unifoam AZ TC-181 | 21.9% PPHR | | | | | | | |

TABLE 3-continued

|  |  |  |  |  |  |  |  |  |  |
|---|---|---|---|---|---|---|---|---|---|
|  | DVB (80% pure) antioxidant MB, LDPE carrier | DVB HP "PR023" | 3.0% PPHR 5.0% PPHR |  |  |  |  |  |  |
|  | process aid MB, LLDPE-butene cop carrier | TPM11165 | 3.0% PPHR |  |  |  |  |  |  |
|  | black MB, LDPE carrier | TPM9527 | 4.0% PPHR | directly fed |  |  |  |  |  |
| Example 4 | PP-PE RCP LLDPE-hexene cop | 7250FL LLP8501.67 | 80% 20% | preblended | counter rotating | 139° C. | 0.149 kW/ (kg/hr) | 2.225 mm | 900 kV | 38.4 kGy |
|  | ADCA | Unifoam AZ TC-181 | 24.0% PPHR |  |  |  |  |  |  |
|  | DVB (80% pure) antioxidant MB, LDPE carrier | DVB HP "PR023" | 3.0% PPHR 4.0% PPHR |  |  |  |  |  |  |
|  | process aid MB, LLDPE-butene cop carrier | TPM11166 | 3.0% PPHR |  |  |  |  |  |  |
|  | zinc oxide MB, LDPE carrier | PM13943 | 2.9% PPHR | directly fed |  |  |  |  |  |
|  | red MB, LDPE carrier | PM47022 | 3.9% PPHR |  |  |  |  |  |  |
| Example 5 | PP-PE RCP LLDPE-hexene cop | 7250FL LLP8501.67 | 80% 20% | preblended | counter rotating | 150° C. | 0.192 kW/ (kg/hr) | 0.850 mm | 600 kV | 45.1 kGy |
|  | ADCA | Unifoam AZ TC-181 | 14.0% PPHR |  |  |  |  |  |  |
|  | DVB (80% pure) antioxidant MB, LDPE carrier | DVB HP "PR023" | 3.0% PPHR 4.0% PPHR |  |  |  |  |  |  |
|  | process aid MB, LLDPE-butene cop carrier | TPM11166 | 3.0% PPHR |  |  |  |  |  |  |
|  | zinc oxide MB, LDPE carrier | PM13943 | 1.0% PPHR |  |  |  |  |  |  |
|  | red MB, LDPE carrier | PM47022 | 5.6% PPHR | directly fed |  |  |  |  |  |

| | Foaming Parameters | | | | Skiving Parameters | | Results | | |
|---|---|---|---|---|---|---|---|---|---|
| | hot water preheat? | radiant heater preheat? | foaming method | foaming temperature | skiving method | number of skived layers | thickness of each layer | density of each layer | gel of each layer |
| Example 1 | yes | yes | combination of molten salt and radiant heaters followed by contact with a cooling drum on the radiant heated surface | 235° C. | uni-directional bandsaw | 2 | 0.825 mm | 0.153 g/cm$^3$ | 41.2% |
| | | | | | | | 0.784 mm | 0.164 g/cm$^3$ | 44.2% |
| Example 2 | yes | yes | combination of molten salt and radiant heaters followed by contact with a cooling drum on the radiant heated surface | 232° C. | uni-directional bandsaw | 2 | 1.945 mm | 0.0344 g/cm$^3$ | 43.7% |
| | | | | | | | 1.902 mm | 0.0466 g/cm$^3$ | 47.3% |
| Example 3 | yes | yes | combination of molten salt and radiant heaters followed by contact with a cooling drum on the radiant heated surface | 238° C. | uni-directional bandsaw | 2 | 1.248 mm | 0.0295 g/cm$^3$ | 38.3% |
| | | | | | | | 1.243 mm | 0.0369 g/cm$^3$ | 38.5% |
| Example 4 | no | no | combination of hot air and radiant heaters in a horizontal oven | 250° C. | uni-directional bandsaw | 3 | 2.058 mm | 0.0430 g/cm$^3$ | 41.0% |
| | | | | | | | 2.309 mm | 0.0366 g/cm$^3$ | 49.4% |
| | | | | | | | 1.650 mm | 0.0461 g/cm$^3$ | 40.8% |
| Example 5 | no | yes | combination of hot air and radiant heaters in a vertical oven | unknown | uni-directional bandsaw | 2 | 0.904 mm | 0.0572 g/cm$^3$ | 39.4% |
| | | | | | | | 0.914 mm | 0.0548 g/cm$^3$ | 42.2% |

TABLE 3-continued

| | | Results | | |
|---|---|---|---|---|
| | layer description/ foaming orientation | mean roughness (Sa) for both surfaces of each layer | height between highest peak and deepest vally (Sz) for both surfaces of each layer | size of surface area evaluation |
| Example 1 | facing radiant heaters | 9.725 μm unskived 51.32 μm skived | 127.5 μm unskived 337.9 μm skived | 9 mm² |
| | contacting molten salt | 69.14 μm skived 9.952 μm unskived | 389.7 μm skived 112.1 μm unskived | |
| Example 2 | facing radiant heaters | 11.89 μm unskived 92.80 μm skived | 128.9 μm unskived 573.7 μm skived | 100 mm² |
| | contacting molten salt | 58.82 μm skived 20.63 μm unskived | 403.6 μm skived 217.5 μm unskived | |
| Example 3 | facing radiant heaters | 9.853 μm unskived 76.97 μm skived | 114.8 μm unskived 568.7 μm skived | 100 mm² |
| | contacting molten salt | 77.42 μm skived 26.77 μm unskived | 554.7 μm skived 349.3 μm unskived | |
| Example 4 | facing radiant heaters | 11.99 μm unskived 115.3 μm skived | 114.1 μm unskived 719.1 μm skived | 100 mm² |
| | — | 108.6 μm skived 110.5 μm skived | 661.6 μm skived 623.4 μm skived | |
| | contacting oven belt | 110.7 μm skived 16.05 μm unskived | 645.5 μm skived 152.3 μm unskived | |
| Example 5 | — | 11.51 μm unskived 59.07 μm skived | 115.4 μm unskived 386.4 μm skived | 100 mm² |
| | — | 60.32 μm skived 10.65 μm unskived | 409.6 μm skived 110.8 μm unskived | |

What is claimed is:

1. A physically crosslinked polyolefin foam sheet comprising at least one polyolefin resin selected from the group consisting of a polypropylene and a polyethylene,
 wherein a surface of the physically crosslinked foam sheet is skived to obtain a skived primary surface and the skived primary surface of the foam sheet has a Sa of about 20 to about 150 μm and an Sz of about 250 to about 1000 μm,
 the foam sheet has an unskived surface and a surface roughness of the skived primary surface of the foam sheet is greater than the surface roughness of the unskived surface,
 the unskived surface has an Sa of about 5 to about 30 μm and an Sz of about 90 to about 350 μm, and
 Sa is defined by the following expression:

$$Sa = \frac{1}{A}\int\int_A |z(x, y)|dxdy.$$

2. The crosslinked polyolefin foam sheet of claim 1, wherein an Sa of the skived primary surface is at least about 2.5 times greater than the Sa of the unskived surface.

3. The crosslinked polyolefin foam sheet of claim 1, wherein the foam sheet has a density of about 0.015 to about 0.250 g/cm³.

4. The crosslinked polyolefin foam sheet of claim 1, wherein the polypropylene has a melt flow index of about 0.1 to about 25 grams per 10 minutes at 230° C.

5. The crosslinked polyolefin foam sheet of claim 1, wherein the skived primary surface of the foamed sheet has a Sa of about 40 to about 150 μm and an Sz of about 300 to about 1000 μm.

6. The crosslinked polyolefin foam sheet of claim 1, wherein the polyolefin resin is a polyethylene.

7. The crosslinked polyolefin foam sheet of claim 1, wherein both surfaces are skived.

8. The crosslinked polyolefin foam sheet of claim 1, wherein the crosslinked foam comprises polypropylene and polyethylene and a ratio of the polypropylene to the polyethylene in the polyolefin foam sheet is about 30/70 to about 90/10.

9. A flooring underlayment comprising the crosslinked foam sheet of claim claim 1.

10. A flooring underlayment system comprising the crosslinked foam sheet of claim 1.

11. A gasket comprising the crosslinked foam sheet of claim 1.

12. A foam tape comprising the crosslinked foam sheet of claim 1.

13. A window glazing system comprising the crosslinked foam sheet of claim 1.

14. The crosslinked polyolefin foam sheet of claim 1, wherein the polyethylene has a melt flow index of about 0.1 to about 25 grams per 10 minutes at 190° C.

15. A method of manufacturing a polyolefin foam sheet according to claim 1 comprising:
 (a) extruding a foaming agent and at least one polyolefin resin selected from the group consisting of a polypropylene and a polyethylene to obtain an unfoamed, extruded sheet;
 (b) irradiating the extruded sheet with ionizing radiation to obtain a physically crosslinked sheet;
 (c) foaming the physically crosslinked sheet with heat to obtain a foamed layer; and
 (d) skiving the foamed layer to obtain a foam sheet with at least one skived surface, wherein the skived surface of the foam sheet has a Sa of about 20 to about 150 μm and an Sz of about 250 to about 1000 μm.

16. The method of claim 15, wherein the foam sheet has a thickness of about 0.8 mm to 3.2 mm.

17. The method of claim 15, wherein the foam sheet has a density of about 0.015 to about 0.250 g/cm³.

18. The method of claim 15, wherein the both surfaces of the foam sheet are skived.

19. The method of claim 15, wherein the foam sheet has an unskived surface.

20. The method of claim 19, wherein a surface roughness of the skived surface of the foam sheet is greater than the surface roughness of the unskived surface.

21. The method of claim 19, wherein an Sa of the skived surface is at least about 2.5 times the Sa of the unskived surface.

22. The method of claim 19, wherein the unskived surface of the foam sheet has an Sa of about 5 to about 30 μm and an Sz of about 90 to about 350 μm.

23. The method of claim 15, wherein the ionizing radiation is selected from the group consisting of alpha rays, beta rays, and gamma rays.

24. The method of claim 15, wherein the polypropylene has a melt flow index of about 0.1 to about 25 grams per 10 minutes at 230° C. and the polyethylene has a melt flow index of about 0.1 to about 25 grams per 10 minutes at 190° C.

25. The method of claim 15, wherein at least about 90% of the cells of the foam sheet have undamaged cell walls.

26. The method of claim 15, wherein an average cell size of the foam sheet is about 0.05 to about 1.0 mm.

27. The method of claim 15, wherein the extruding is at a specific energy of at least about 0.090 kW·hr/kg.

28. The method of claim 15, wherein the crosslinked sheet is about 20 to about 75% crosslinked.

29. The method of claim 15, wherein the polyolefin resin is a polyethylene.

30. The method of claim 15, wherein the polyolefin resin is a blend of the polypropylene and the polyethylene.

31. The method of claim 30, wherein a ratio of the polypropylene to the polyethylene in the polyolefin resin is about 30/70 to about 90/10.

32. The method of claim 15, wherein an amount of the foaming agent is less than about 80% PPHR.

\* \* \* \* \*